2,973,495
TEMPERATURE MEASURING DEVICE

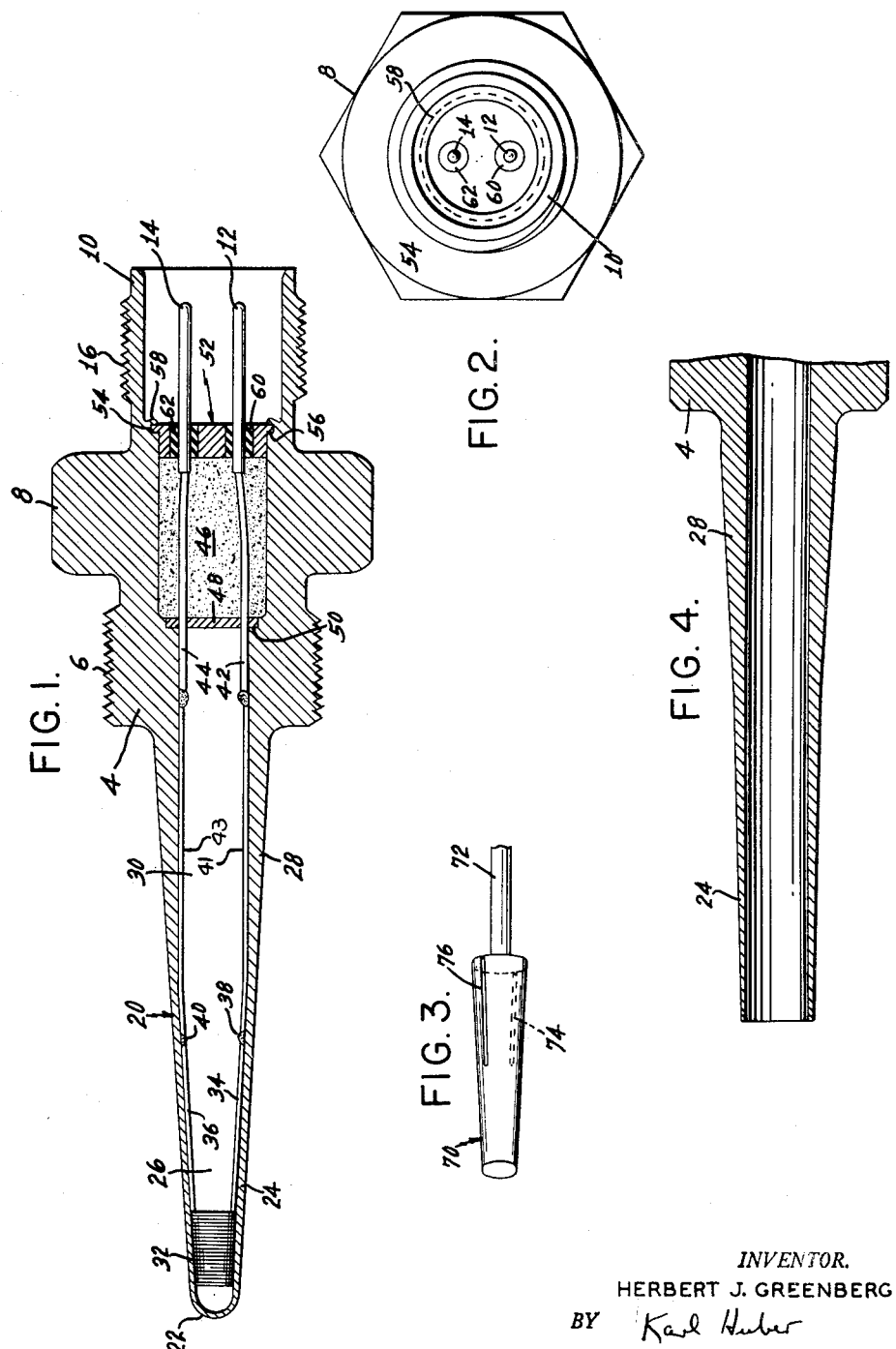
Feb. 28, 1961  H. J. GREENBERG  2,973,495
TEMPERATURE MEASURING DEVICE
Filed June 20, 1958
INVENTOR.
HERBERT J. GREENBERG
BY Karl Huber
James E. Bryan
ATTORNEYS

United States Patent Office 2,973,495
Patented Feb. 28, 1961

Herbert J. Greenberg, Livingston, N.J., assignor, by mesne assignments, to Engelhard Industries, Inc., Newark, N.J., a corporation of Delaware Filed June 20, 1958, Ser. No. 743,397

13 Claims. (Cl. 338—28)

This invention relates to a temperature measuring device and, more particularly, is concerned with a device for continuously detecting the temperature of a flowing medium, such as a liquid or gas, where severe requirements have to be met with respect to the speed of response as well as the temperature range to be covered, and where resistance to fatigue by vibrations under the flexural forces caused by the flowing medium must be considered.

Generally, thermometers of the type in question consist of a temperature sensing element such as a thermocouple or a resistance wire mounted in a casing which is placed within a stream of the flowing medium, the temperature of which is to be measured. Preferably, and in order to ensure rapid and accurate response, the casing protrudes into the stream of the flowing medium and has, for example, the shape of a tube sealed into the wall of the channel in which the fluid medium flows, whereby the cavity in the tube serves to conceal the wires leading from the sensing element mounted on the exterior of the tube through the wall and to the registering devices. The protruding tube, however, under the influence of the flowing medium, acts as a cantilevered beam and constantly vibrates, which is detrimental to the structure of the device, especially when occurring with a large amplitude; this is the case when the vibration frequency coincides with the natural frequency of the beam.

It has been found that by the application of the principles of stress analysis in non-related fields, the vibrational characteristics of the aforementioned casing protruding into the flowing medium can be improved to a large extent by the use, as the casing, of a stem in the shape of a cone having a cavity therein, whereby the thickness of the conical wall decreases continuously towards the tip of the cone, at least along a portion of the length of the stem. The conical outer form of the stem and the fact that the walls thereof are tapered towards the cone tip cooperate to increase the natural vibration frequency beyond the frequency to which the stem is vibrated by the medium into which it protrudes. Since the sensing element is located within the thin-walled tip portion of the stem and the thick-walled base portion terminates into a plug adapted to be mounted in the wall of the channel containing the flowing medium, the device according to the invention combines a maximum speed of response with the high resistance against vibration fatigue and mechanical stress.

Furthermore, the conical shape of the cavity in the stem is used according to the invention to facilitate the insertion of a resistance wire, serving customarily as the sensing element, by means of a mandrel as described hereinafter.

The invention also includes a method for producing the hollow, conical stem from a single-piece blank which method forms the stem by steps which contribute to the resistance to vibration fatigue, and eliminates any machining detrimental thereto.

The invention will be further illustrated by reference to the accompanying drawing in which Figure 1 is a longitudinal sectional view through a resistance thermometer, Figure 2 is an end view of Figure 1, Figure 3 is a perspective view of a mandrel used for inserting the resistance wire coil of Figure 1, and Figure 4 is a longitudinal sectional view of a blank before swaging.

Referring to Figures 1 and 2, the device is a unitary structure including an adapter 4 provided with an external screw thread 6 for securing it into a tapped aperture in the wall of the container, channel or the like (not shown), in which a fluid medium flows, by turning the integral nut 8. A cylindrical end piece 10 forms a protecting shield around a pair of connector pins 12 and 14 and may be provided with an external screw thread 16 which is adapted to mate with a female connector (not shown) enclosing the shield 10 in a customary manner.

In accordance with the invention, the portion of the device which protrudes into the flowing medium consists essentially of a hollow, conical stem 20 terminating preferably in a rounded tip 22. It has been found advantageous to provide two distinct portions of the stem such that the tip portion 24 has an even or preferably slightly tapered wall thickness which results in a conical cavity 26 therein, whereas the second portion 28 has a wall thickness decreasing to such an extent towards the tip 22 that a cylindrical cavity 30 is formed which continues and smoothly connects into the conical cavity 26. The wall thickness in the tip portion 24 is chosen in accordance with the specific requirements for speed of response in each case. Good results have been obtained when the length of the tip portion 24 substantially equals the length of the base portion 28.

The sensing element consists of a bifilar double-wound coil 32 of any suitable resistance wire in the shape of a cone having the same shape as the cavity 26 and is bonded to the wall thereof by means of a bonding agent, for example, a thermosetting silicone resin. In order to connect the coil 32 into a circuit for registering the temperature measured, the ends 34 and 36 of the resistance wire extend through the cavity 26 diametrically opposite along the interior wall and are bonded thereto. In order to adjust the total resistance of the thermometer to the desired values at various temperature levels, an additional resistance in the circuit is obtained by using lead-in conductors of a material having a constant resistance within the temperature range the device is intended to cover. For this purpose, the wire ends 34 and 36 are welded to a pair of insulated constantan lead-in wires 41 and 43 at the points 38 and 40, respectively, which wires are bonded to the inside surface of the stem portion 28. The connection with the pins 12 and 14, respectively, is made by means of the silver leads 42 and 44, passing through a filling 46 of talc, magnesium oxide, or aluminum oxide contained in an enlarged portion of the cavity in the adapter portion 4. In order to retain and compress the filling, a disc 48 having the leads 42 and 44 passing therethrough is mounted in the cavity bearing against the shoulder 50 in the cavity 30. At the other side of the cavity, the filling 46 is retained by means of a header assembly 52 having a flange 54, the flange bearing against a second shoulder 56. The header 52 is maintained in position by machining the ring 58 into the material of the shield 10 and crimping it over the outer edge of the flange 54. The connector pins 12 and 14 are sealed in the header assembly 52 by means of a pair of insulating inserts 60 and 62, respectively.

It has been found that in a thermometer of extreme sensibility capable of registering very small changes in temperature, erroneous readings are caused by the fact that at the location where the resistance wire is welded to the lead-in conductor an electromotive force is generated because this portion performs as a thermocouple. Since the connection with lead-in conductors is a necessity, the invention eliminates such errors by providing a pair of lead-in conductors 41 and 43, each conductor being connected to one end of the temperature sensitive resistance wire. Both conductors, preferably made from constantan as mentioned before, have identical dimensions, i.e. cross sections and lengths and are mounted symmetrically within the cavity of the stem; hence, the welds 38 and 40 and, likewise, the welds 78 and 80 face each other and therefore are at locations of equal temperature during performance. As a result, the electromotive forces generated at the welds 38 and 40 as well as at the welds 78 and 80 compensate each other, whereby erroneous readings are prevented, since no thermoelectric current results.

As has been previously pointed out, the conical shape of the stem, having the wall thickness tapered towards the tip of the cone, improves the fatigue resistance of the device. A further advantage of the conical shape is the facility with which the conical resistance wire coil 32 may be inserted into the tip portion 24 of the stem. According to the invention, a cone-shaped mandrel 70, shown in Figure 3, having the same shape as the cavity 26 and being provided with a handle 72 is used for winding the coil 32 thereon. A pair of grooves 74 and 76 located diametrically opposite in the body portion of the mandrel serve to receive the wire ends 34 and 36 when inserting the assembly into the cavity 26. It has been found advantageous to coat the inside wall forming the cavity 26 with a thermosetting silicone resin, insert the mandrel having the coil 32 wound thereon and subject the entire assembly to a heat treatment until the resin is set, thus bonding the coil 32 to the wall of the cavity 26 whereupon the mandrel 70 can be easily and readily removed. The mandrel is fabricated from the identical material as the stem so as to expand with the latter at the same rate when subjected to the heat for curing the resin, and is coated with a material which will not adhere to the resin such as tetrafluoroethylene, for example hence the removal can be effected without difficulty.

The invention provides, additionally, a method for producing the cone-shaped hollow stem described hereinbefore. This method consists essentially of preparing an open tube-shaped blank having thereon the integral adapter 4 and nut 8 and the cylindrical end portion 10, from a nickel alloy, known as Monel, for example, or any other suitable material. Then, the cavities are machined into the blank by enlarging the inner cylindrical diameter of the tube. This is accomplished by gundrilling, internal broaching, reaming, honing or any other method until a cylindrical cavity throughout the entire stem is obtained as shown in Figure 4. Subsequently, a mandrel having the shape of the cavity 26 and 30 combined is inserted therein, and the cone-shaped inner surface is obtained by swaging. In order to form the tip, the stem is spun against a mandrel, of preferably half-round shape to diminish the aperture remaining in the tip and the stem is completely closed by welding, suitably in a helium atmosphere.

It has been found that when the method of swaging is used to exert forces and grain flow of the metal in a longitudinal direction of the stem, the vibration fatigue characteristics are greatly improved as compared to a similar workpiece obtained, for example, by final turning on a lathe. The metal displacement during swaging takes place in the longitudinal direction only and it can be assumed that the grain flow is thereby altered to increase the resistance to vibration fatigue of the finished stem and to avoid circumferential tool marks which have an opposite effect.

It will be obvious to those skilled in the art that many modifications may be made within the scope of the present invention without departing from the spirit thereof, and the invention includes all such modifications.

What is claimed is:

1. In a device of the character described, a metallic, integral, hollow stem in the shape of a cone having a closed tip portion and forming a conical cavity therein, both the thickness of the wall of the stem and the width of the cavity decreasing continuously toward the tip of the cone along at least a portion of the length of the stem, and electrical sensing means secured to the internal wall of the tip portion but insulated therefrom.

2. In a device of the character described, a metallic integral, hollow stem in the shape of a cone having a closed tip portion and forming a conical cavity therein, both the thickness of the wall of the stem and the width of the cavity decreasing progressively toward the tip of the cone, and electrical sensing means secured to the internal wall of the tip portion of the cavity but insulated therefrom.

3. In a device of the character described, a metallic, integral, hollow stem in the shape of a cone having a closed tip portion and forming an at least partly cone-shaped cavity therein, both the thickness of the wall of the stem and the width of the cavity decreasing continuously toward the tip of the cone along at least a portion of the length of the stem, and electrical resistance sensing wire secured to the cone-shaped cavity wall of the tip portion to make thermal contact with the wall but insulated therefrom.

4. In a device of the character described, a metallic, integral, hollow cone-shaped stem having a closed tip portion and a base portion, the tip portion having its wall thickness tapered toward the tip to form a cone-shaped cavity, the base portion having it wall thickness tapered to form a substantially cylindrical, continuing cavity, and electrical resistance sensing wire secured to the cone-shaped cavity wall of the tip portion to make thermal contact with the wall, but insulated therefrom.

5. In a device of the character described, a metallic, integral, hollow cone-shaped stem having a closed tip portion and a base portion, the tip portion having its wall thickness tapered toward the tip to form a cone-shaped cavity, the base portion having its wall thickness tapered to form a substantially cylindrical, continuing cavity, the length of the tip portion being substantially that of the base portion, and electrical sensing means mounted in the tip portion of the cavity.

6. In a resistance thermometer, a stem in the shape of a hollow cone having a conical cavity therein, the thickness of the wall of the stem decreasing continuously toward the closed tip thereof along at least a portion of the length of the stem, and a temperature responsive resistance wire insulatingly bonded to the inner conical surface of the tip portion of the cavity.

7. In a resistance thermometer, a hollow stem having a closed tip portion, the inner surface of said tip portion forming a conical cavity, said surface being coated with a film of insulating, heat-resistant material, and an electrical resistance wire at least partly imbedded in and maintained electrically insulated from said wall by said film, the significant contents of said cavity consisting essentially of said resistance wire and said film.

8. In a resistance thermometer, a hollow stem having a closed tip portion, the inner surface of said tip portion forming a conical cavity, an electrical resistance wire being mounted in said cavity and insulating, heat-resistant adhesive means for maintaining said resistance wire in thermal contact with said surface and electrically insulated therefrom, the significant contents of said cavity consisting essentially only of said resistance wire and said adhesive means.

9. A method for mounting a wire coil into a cavity having gradually converging inner walls, which comprises winding the wire into a coil on a mandrel having a shape matching that of the cavity, inserting a bonding agent and the mandrel into said cavity until the wire coil contacts the inner cavity wall, and removing the mandrel after the bonding agent has set and secured the coil to the inner surface of the cavity wall.

10. A method for mounting a resistance wire coil into a cone-shaped cavity which comprises winding the resistance wire of a conical mandrel having a shape identical with that of the cavity, coating the cavity wall with a thermosetting material, inserting the mandrel with the resistance wire coiled around it into said cavity until the resistance wire coil contacts the cavity wall, subjecting the assembly to a heat treatment until bonding of the resistance wire to the cavity wall occurs, and removing the mandrel from the cavity.

11. A method for mounting a resistance wire coil into the cone-shaped cavity of a thermometer probe, which comprises coating the cavity wall with a thermosetting material, winding the resistance wire on a conical mandrel which is not capable of a bond with said thermosetting material, the mandrel surface having a shape identical with that of the cavity, subjecting the assembly to a heat treatment until bonding of the resistance wire to the cavity wall occurs, and removing the mandrel from the cavity.

12. In a resistance thermometer, a hollow stem having a closed tip portion, said tip portion forming a conical cavity, the width of said cavity decreasing toward the tip of the cone, and an electrical resistance wire coil insulatingly secured to the inner conical surface of said stem by means of a bonding agent, the significant contents of said cavity consisting essentially only of said coil and said bonding agent.

13. In a resistance thermometer, a hollow stem having a closed tip portion, said tip portion forming a conical cavity, the width of said cavity decreasing toward the tip of the cone, said stem having its wall thickness tapered toward the tip of the cone, and an electrical resistance coil insulatingly secured to the inner wall of said cavity by means of a bonding agent, the significant contents of said cavity consisting essentially only of said coil and said bonding agent.

References Cited in the file of this patent

UNITED STATES PATENTS

| | | |
|---|---|---|
| 2,102,030 | Quereau | Dec. 14, 1937 |
| 2,135,078 | Hubbard et al. | Nov. 1, 1938 |
| 2,379,530 | Lederer | July 3, 1945 |
| 2,441,564 | Combs | May 18, 1948 |
| 2,465,981 | Robertson | Mar. 29, 1949 |
| 2,579,271 | Polye | Dec. 18, 1951 |
| 2,588,014 | Knudsen | Mar. 4, 1952 |
| 2,590,041 | Roost | Mar. 18, 1952 |
| 2,753,714 | Perkins et al. | July 10, 1956 |

OTHER REFERENCES

Sligh: Paper No. 407, Bureau of Standards, Jan. 5, 1921.